No. 718,578. PATENTED JAN. 13, 1903.
G. W. PELTON.
TOOL HOLDER FOR BUTTON MAKING MACHINES.
APPLICATION FILED AUG. 8, 1902.
NO MODEL. 2 SHEETS—SHEET 1.

G. W. Pelton, Inventor by C. A. Snow & Co.
Attorneys

Witnesses

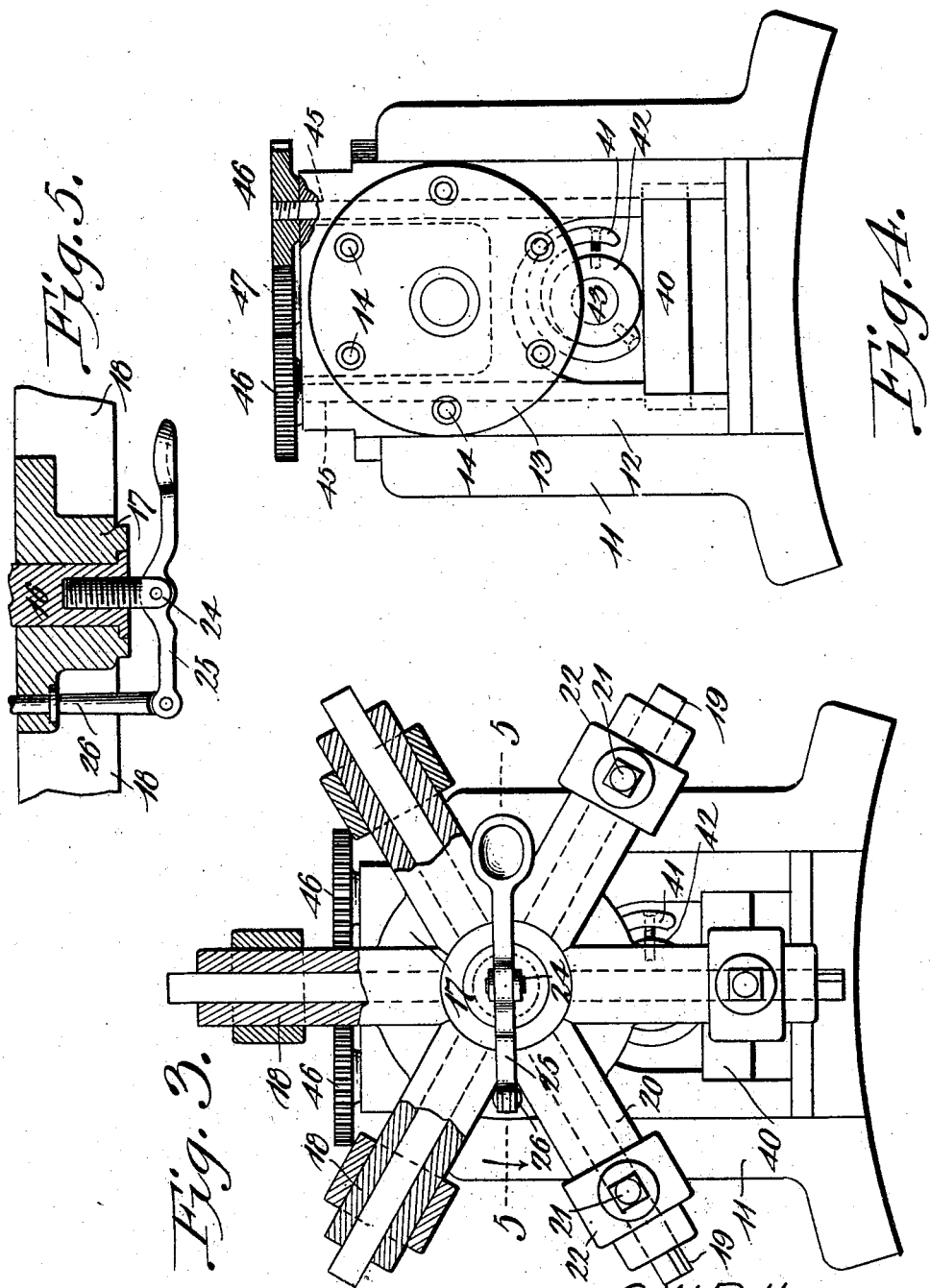

UNITED STATES PATENT OFFICE.

GEORGE W. PELTON, OF MUSCATINE, IOWA, ASSIGNOR TO BOEPPLE BUTTON COMPANY, OF MUSCATINE, IOWA.

TOOL-HOLDER FOR BUTTON-MAKING MACHINES.

SPECIFICATION forming part of Letters Patent No. 718,578, dated January 13, 1903.

Application filed August 8, 1902. Serial No. 118,939. (No model.)

*To all whom it may concern:*

Be it known that I, GEORGE W. PELTON, a citizen of the United States, residing at Muscatine, in the county of Muscatine and State of Iowa, have invented a new and useful Tool-Holder for Button-Making Machines, of which the following is a specification.

This invention relates to certain improvements in machinery of that class employed in the manufacture of buttons from mother-of-pearl and other hard substances.

The principal object of the invention is to provide an improved form of tool-holder for the purpose of carrying a plurality of tools, the tool-carrier being readily and quickly adjusted to present a sharpened tool to operative position and removing a worn or dull tool.

A further object of the invention is to provide a sharpening device in connection with the tool-carrier in order that worn tools may be sharpened without removing the same from the carrier; and a further object is to provide a mechanism for automatically compensating for the loss of material under the action of the grinding-tool in order that the tool may accomplish the same work without regard to its length or the number of times which it is subjected to the action of the grinder.

With these and other objects in view the invention consists in the novel construction and arrangement of parts hereinafter described, illustrated in the accompanying drawings, and particularly pointed out in the appended claims.

Figure 2:
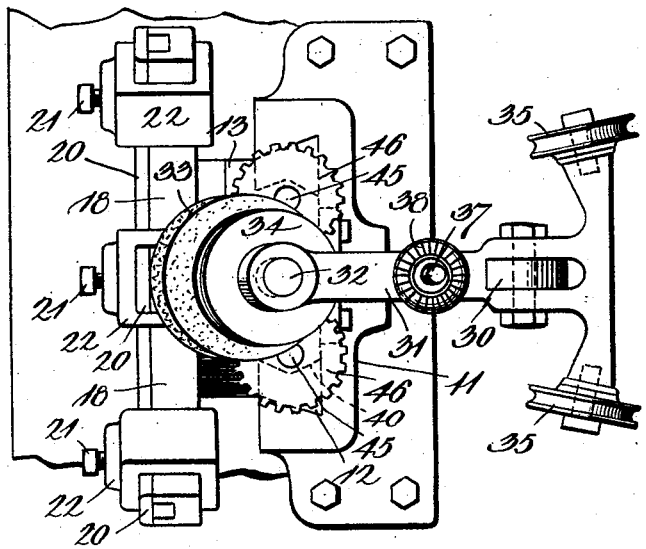
Figure 1:
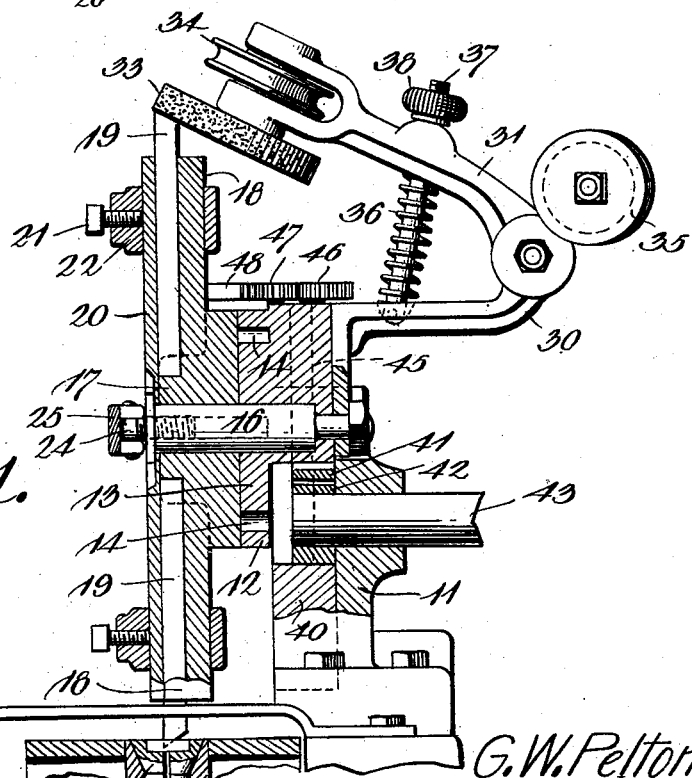

In the accompanying drawings, Figure 1 is a sectional side elevation of a tool-carrier constructed in accordance with my invention. Fig. 2 is a plan view of the same. Fig. 3 is a front elevation of the tool-carrier, a number of the tool-carrying arms being broken away in order to more clearly illustrate the construction. Fig. 4 is an elevation of the tool-carrying slide and its supporting-standard. Fig. 5 is a sectional plan view of the tool-carrier-locking device on the line 5 5 of Fig. 3.

Similar numerals of reference are employed to indicate corresponding parts throughout the several figures of the drawings.

In the manufacture of buttons from mother-of-pearl and material of like nature much difficulty is experienced in keeping the tools in proper condition, the material being extremely hard and the machines being operated at a comparatively high speed. The cutting, turning, shaping, and drilling tools require frequent sharpening, and in machines ordinarily constructed it is necessary to remove the tools from the machine for sharpening purposes, and when a fresh tool is placed in position considerable time is lost in properly adjusting the same. To overcome this objection and to provide a supply of sharpened tools which may be instantly moved to operative position is the principal object of the present invention.

The tool-carrier herein illustrated and described is employed to carry a number of tools for turning or centering button-blanks, the tool being moved into contact with the central portion of a blank and forming a recess or depression therein.

In the drawings, 10 indicates a button-holding chuck in which a button is placed and moved to a position under the centering-tool. The frame of the button-machine is provided with a standard 11, having a dovetailed guideway for the reception of a reciprocatory slide 12, the front portion of the slide being secured to or formed integral with a disk 13, in which are a number of openings 14, adapted for the reception of a locking-pin by which the tool-carrier is held in adjusted position. The slide is provided with a stud 16, on which is mounted a tool-carrier comprising a central disk 17 and a plurality of radially-disposed arms 18, each of said arms having a radial groove for the reception of a tool 19. The tools are held in place by removable face-plates 20, engaging one face of the tool and confined in position by set-screws 21, carried by collars 22, embracing the arms and face-plates. The construction permits of the radial adjustment of the tool to any desired extent, and each tool is formed of a bar of hardened metal, which is adjusted from time to time as the projected end of the tool is ground away by frequent sharpening.

The stud 16 carries a pin 24, to which is pivoted a locking-lever 25, connected at one end to a locking-pin 26, adapted to a guiding-opening in the disk 17. The opposite end of the arm is provided with a handle or knob by which the lever may be operated to effect the removal of the pin from one of the openings 14 and the turning of the tool-carrier to present another tool to operative position, the locking-pin entering any one of the openings 14 and confining the tool-holder in any position to which it may be adjusted.

To the rear face of the dovetailed slide is secured a bracket 30, to which is pivoted an arm 31, provided at its free end with bearings for the reception of a spindle 32, on which are secured the grinding-disks 33 and a grooved pulley 34, the latter being driven by a suitable belt, preferably operated from a movable portion of the button-machine, the belt being guided over idlers 35, carried by the arm 31. The grinding-disk 33 is adjusted to and from the tools by a spring 36, surrounding a rod 37, one end of which is threaded for the reception of a milled thumb-nut 38, the nut being turned from time to time in order to depress the disk in accordance with the amount of material removed from the cutting-faces of the various tools.

In the lower portion of the dovetailed slide 12 is a recess the lower wall of which is formed by a vertically-movable bar 40, and fitted within the recess is a cam comprising a curved bar 41, adjustably secured to a collar 42, mounted on the end of a revoluble shaft 43, the turning of the shaft revolving the cam and causing a vertical reciprocating motion of the slide 12 and the tool-holder carried thereby. At each movement of the slide one of the cutting-tools is forced down into contact with the button-blank carried by the chuck 10, and the central portion of the blank is cut away to form a recess or depression.

During the operation of the button-machine the frequent sharpening of the tools 19 materially decreases the distance between the center of rotation of the tool-holder and the cutting edges of the tool, and as the vertical movement imparted to the tool-holder and slide is fixed the shortening of the tools would tend to lessen the depth of cut in the button-blank. To compensate for the shortening of the tools without the necessity of radially adjusting each tool, I make the bar 40 vertically adjustable and gradually raise said bar each time the tools are subjected to the action of the grinder.

To the bar 40 are secured a pair of threaded rods 45, extending up through suitable guiding-openings in the slide 12 and provided at their upper ends with gears 46, having threaded hubs fitting over the threaded ends of the screws. Between the two gears is a pinion 47, loosely mounted on a stud at the top of the slide and intermeshing with both gears. On one arm of the revoluble tool-carrier is a rearwardly-projecting pin 48, which comes into contact with the pinion 47 at each revolution of the tool-carrier, the pinion and gears being turned and the latter causing a slight vertical movement of the threaded spindles 45 and the slide 40, the slide 40 being elevated a distance sufficient to compensate for the material removed by the action of the grinding-disk.

In starting the device into operation the several tools are first adjusted in the arms of the tool-carrier, and the latter is then rotated once in order to bring the end of each tool into contact with the grinding-disk in order that the distance between the cutting edges of the tools and the center of rotation of the tool-carrier may be uniform. The blank-carrying chucks, which may be of any desired construction and operated in any manner, are then presented beneath the tool-carrier and are revolved while the tool-carrier is forced down by the cam 41 and the tool brought into contact with the central portion of the blank. When a tool becomes dull, the locking-pin is released and the tool-carrier turned to bring a fresh tool into proper position, the worn tools being gradually turned until they are brought into contact with the grinder and resharpened.

While the construction herein described, and illustrated in the accompanying drawings, is the preferred form of the device, it is obvious that various changes in the form, proportions, size, and minor details of the structure may be made without departing from the spirit or sacrificing any of the advantages of the invention.

Having thus described my invention, what I claim is—

1. The combination in a tool-holder, of a revolubly-mounted hub having a plurality of radial arms each provided with a radially-disposed recess for the reception of a cutting-tool, means for clamping the tools therein, and means for automatically adjusting the hub and its attached parts in a direction at right angles to the axis of the hub to compensate for wear of the tools.

2. A tool-holder comprising a revolubly-adjustable hub, a plurality of radially-disposed and recessed tool-receiving arms, face-plates for covering the recesses, clamps encircling the arms and face-plates and serving to hold the plates and tools in position, and means for automatically adjusting the hub and arms in a direction at right angles to the axis of the hub to compensate for wear of the tools.

3. In a tool-holder, a manually-adjustable hub having a plurality of radially-disposed tool-receiving arms, a stud on which said hub is mounted, an operating-lever supported by the stud, a locking-pin extending through an opening in the hub and connected to said lever, and a slide having a plurality of openings for the reception of said pin.

4. In a tool-holder, a hub member, a centrally-disposed stud carrying said hub member, a plurality of radially-disposed tool-carrying arms each having a recess for the reception of a tool, face-plates covering the recesses, a clamping-collar encircling each arm and its face-plate, a set-screw carried by the collar and impinging on the face-plate, a lever carried by the stud, a slide having a plurality of openings for the reception of the pin, and a locking-pin carried by the lever.

5. A tool-holder comprising a revolubly-adjustable hub having a plurality of tool receiving and supporting arms, means for adjusting and for locking the hubs and arms in position, a tool-sharpening device mounted adjacent to the arms and adapted to act on the tools, and means for moving the grinding-disk into contact with the tools.

6. In a device of the class specified, a reciprocatory slide, a revoluble tool-holder carried by the slide, means for locking the tool-holder in adjusted position, a grinding-disk supported by the slide, and means for moving the grinding-disk into contact with the tool.

7. In a device of the class specified, a reciprocatory slide, a revoluble tool-holder carried thereby, means for locking the tool-holder in adjusted position, a bracket carried by the slide, an arm pivoted to said bracket, a revoluble grinding-disk carried by the arm, and means for adjusting the arm to force the grinding-disk into operative engagement with the tool.

8. In a device of the class specified, a reciprocatory slide, a revoluble tool-holder carried thereby, tools supported by the holder, means for locking the tool-holder and tools in adjusted position, a bracket carried by the slide, an arm pivoted to the bracket, a spindle carried by the arm, a grinding-disk and belt-wheel mounted on said spindle, belt guiding and tightening wheels carried by the arm, a threaded rod carried by the bracket and extending through an opening in the arm, a spring encircling the threaded rod at a point between the bracket and arm, and a thumb-nut carried by the threaded portion of the arm and serving to adjust the grinding-disk to operative position.

9. In a device of the class specified, a reciprocatory slide, means for operating the same to force the tools into operative position and return the same to inoperative position, a tool-holder carried by the slide, tools supported by said tool-holder, a tool-grinding device, and means for automatically adjusting the position of the slide to compensate for the wear of the tools.

10. In a device of the class specified, a slotted standard, a slide carried thereby, a tool-holder carried by said slide, tools supported by the said holder, a tool-sharpening device carried by the slide, a cam adapted to a recess in the slide, a cross-bar carried by the slide and adapted to be engaged by the cam, and means for automatically adjusting said bar to compensate for the wear of the tools.

11. In a device of the class specified, a slotted standard, a slide guided thereby, a cross-bar carried by the slide, threaded rods connected to said bar, gears adapted to the threaded rods, a pinion intermeshing with said gears, a cam adapted to engage the bar to effect a depression of the slide, a revolubly-mounted tool-holder carried by the slide, tools carried by said tool-holder, and a pin or lug carried by the tool-holder and adapted to engage with the teeth of said pinion.

In testimony that I claim the foregoing as my own I have hereto affixed my signature in the presence of two witnesses.

GEORGE W. PELTON.

Witnesses:
L. S. ST. C. DENNID,
E. W. SMITH.